United States Patent
DeBusk et al.

[19]
[11] Patent Number: 5,993,649
[45] Date of Patent: Nov. 30, 1999

[54] SEQUENTIAL BIOLOGICAL-CHEMICAL WATER TREATMENT SYSTEM

[76] Inventors: Thomas A. DeBusk, 3208 Westchester Dr., Cocoa, Fla. 32926; Edward F. Dierberg, 407 Beauregard Ave. NE., Palm Bay, Fla. 32907

[21] Appl. No.: 08/768,494

[22] Filed: Dec. 18, 1996

Related U.S. Application Data

[60] Provisional application No. 60/009,687, Jan. 3, 1996, and provisional application No. 60/012,109, Jan. 24, 1996.

[51] Int. Cl.$^6$ ........................................... C02F 3/32
[52] U.S. Cl. ........................... 210/97; 210/103; 210/170; 210/198.1; 210/602; 210/614; 210/739; 210/743
[58] Field of Search ..................... 210/602, 620, 210/621, 622, 623, 630, 705, 723, 724, 726, 730, 150, 151, 170, 912, 902, 198.1, 97, 614, 739, 743, 143

[56] References Cited

U.S. PATENT DOCUMENTS

| | | |
|---|---|---|
| 764,783 | 7/1904 | Van Choate . |
| 800,187 | 9/1905 | Venable . |
| 968,015 | 8/1910 | Wilkie . |
| 3,385,786 | 5/1968 | Klock . |
| 3,635,816 | 1/1972 | Golub ..................................... 210/602 |
| 3,770,623 | 11/1973 | Seidel . |
| 4,284,510 | 8/1981 | Savard et al. . |
| 4,415,450 | 11/1983 | Wolverton . |
| 4,824,572 | 4/1989 | Scott . |
| 4,872,985 | 10/1989 | Dinges . |
| 4,904,386 | 2/1990 | Kickuth . |
| 4,971,690 | 11/1990 | Justice . |
| 5,106,504 | 4/1992 | Murray . |

(List continued on next page.)

FOREIGN PATENT DOCUMENTS

| | | |
|---|---|---|
| 3244-787 | 6/1984 | Germany . |
| 3941-211 | 6/1991 | Germany . |
| 300015-A7 | 5/1992 | Germany . |
| 5 8070-891 | 4/1983 | Japan . |
| 0644-570 | 8/1984 | Switzerland . |

OTHER PUBLICATIONS

Aquatic Plant Systems for Wastewater Treatment: Engineering Considerations, G. Tchobanoglous, Dept. of Civil Engineering, University of California, Davis, CA 95616; Excerpt from Aquatic Plants for Water Treatment and Resource Recovery, K.R. Reddy and W.H. Smith, pp. 27–48, 1987.

The Green Revolution in Wastewater Treatment, Becky Gillette, BioCycle, pp. 44–47, Dec. 1992.

A Report on the Use of Shredded Scrap Tires in On–site Sewage Disposal Systems, prepared by Envirologic, Inc., 139 Main Street, Brattleboro, VT 05301, for The Dept. of Environmental Conservation, State of Vermont, Recycling Market Development Grant, May 22, 1990.

A Pilot Study of Vertical Flow Wetlands at Coffs Harbour, New South Wales, Australia, A.J. Chick and D.S. Mitchell, Wat. Sci. Tech., vol. 32, No. 3, pp. 103–109, 1995.

*Primary Examiner*—David A. Reifsnyder
*Attorney, Agent, or Firm*—Allen, Dyer, Doppelt, Milbrath & Gilchrist, P.A.

[57] ABSTRACT

A low-cost water and wastewater treatment system having several embodiments achieves efficient contaminant removal in an environmentally "friendly" manner. The technology couples biological and passive chemical unit processes, and relies largely on pH changes to remove contaminants. A first embodiment focuses on a sequential two-unit treatment process consisting of a submersed aquatic vegetation (SAV) cell followed by a limerock (LR) bed. A second embodiment merges the two sequential treatments into one compartment where the LR bed is coincident with the SAV unit. A third embodiment describes the replacement of the SAV unit with a periphyton raceway unit, which is then followed sequentially by a LR bed. All three embodiments contain control elements for determining when and how much recycle within and flow between the treatment systems should occur, and if and when chemical addition should be performed.

23 Claims, 4 Drawing Sheets

U.S. PATENT DOCUMENTS

| | | |
|---|---|---|
| 5,106,511 | 4/1992 | Kodukula . |
| 5,137,625 | 8/1992 | Wolverton . |
| 5,156,741 | 10/1992 | Morrison et al. . |
| 5,174,897 | 12/1992 | Wengrzynek . |
| 5,273,653 | 12/1993 | Kickuth . |
| 5,288,406 | 2/1994 | Stein . |
| 5,389,257 | 2/1995 | Todd et al. ............................... 210/602 |
| 5,486,291 | 1/1996 | Todd et al. . |
| 5,500,131 | 3/1996 | Metz ....................................... 210/705 |
| 5,505,862 | 4/1996 | Sonnenrein . |
| 5,676,836 | 10/1997 | Yamasaki et al. ....................... 210/602 |

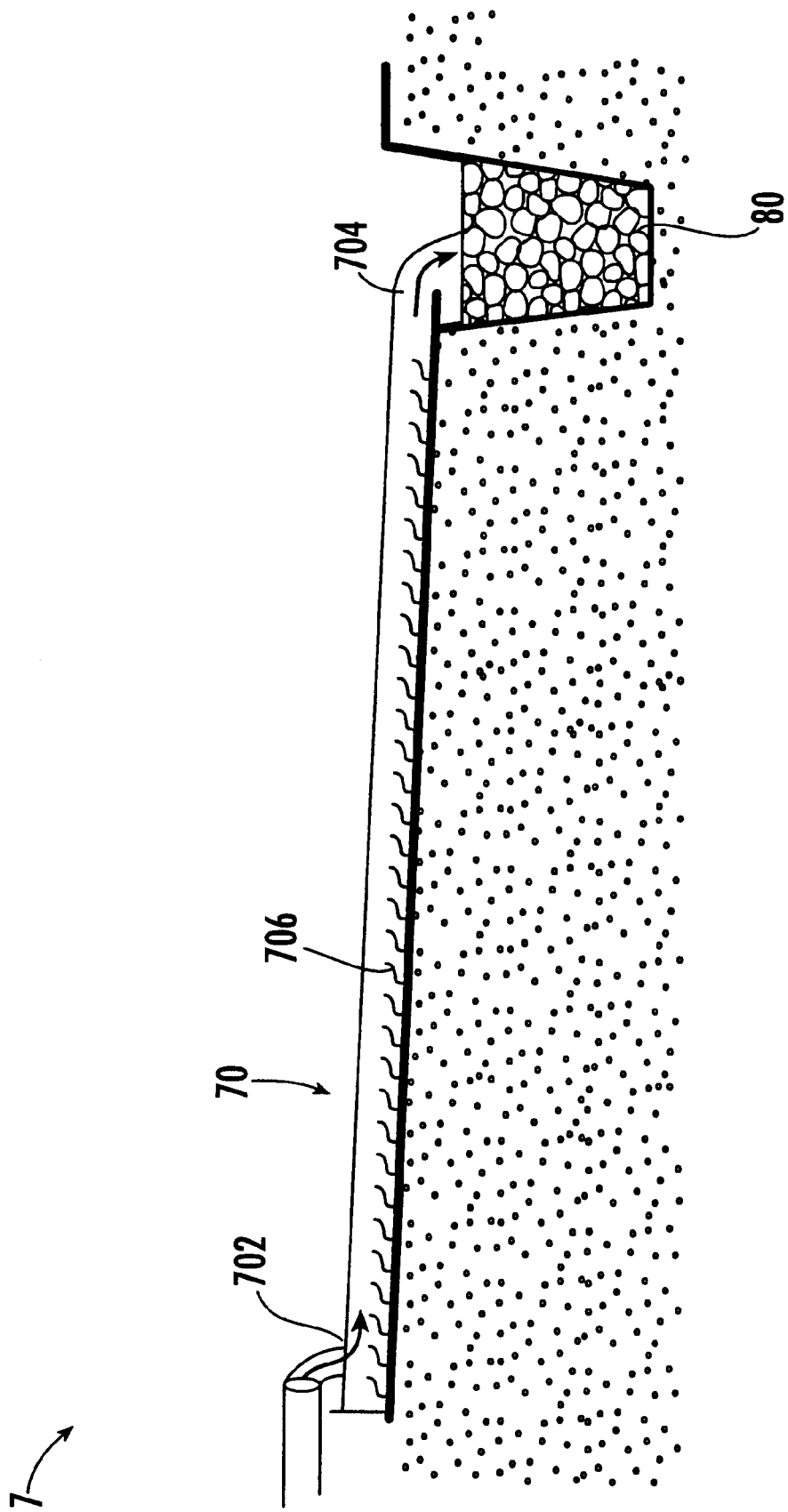

SEQUENTIAL BIOLOGICAL-CHEMICAL WATER TREATMENT SYSTEM

This application claims the benefit of U.S. Provisional Application Ser. No. 60/009,687, filed Jan. 3, 1996 and U.S. Provisional Application Ser. No. 60/012,109, filed Jan. 24, 1996.

BACKGROUND OF THE INVENTION

1. Field of the Invention

The present invention pertains to the removal of metals, nitrogen, phosphorus, oxygen-demanding substances, and certain classes of synthetic organic compounds from municipal, industrial, urban, and agricultural wastewaters and runoff. In addition, the invention has application to the treatment of surface and ground waters.

2. Description of Related Art

Chemicals such as iron and aluminum salts frequently are used to coagulate and remove phosphorus and other contaminants from wastewaters and runoff. One drawback of chemical treatment technologies, besides the expense, is that most of them contribute toxic residual components (e.g., aluminum, caustic pH, and a potential for sulfide production) either to the treated wastewater or to the residual sludge/backwash. Chemical treatment systems also require operator control and maintenance, coagulant aids, pH stabilization, the use of hazardous chemicals, and sludge/backwash residuals disposal, all factors that are expensive and require energy supplements and process control capability. The cumulative effect of these requirements is that the systems are reliable only when they are designed, constructed, maintained, and operated by skilled personnel. For instance, in the case of phosphorus, there are instances when the target 50 ppb total phosphorus (TP) concentration in treated agricultural drainage waters has not been met with chemical-intensive techniques, even with intensive oversight (Anderson et al., 1992).

Wetlands, artificial (constructed) or natural, are commonly used as a less expensive and more passive vehicle than conventional technology for treating many types of wastewaters, such as domestic sewage, urban and agricultural runoff, industrial and mining wastes. Wetlands can support and provide the necessary biogeochemical processes needed for the transformation, reduction, and immobilization of primary, secondary, and trace pollutants (including xenobiotics and heavy metals). The passive nature of wetland treatment technologies makes them cost effective compared to more traditional engineered wastewater treatment systems.

One drawback to wetland treatment systems is their requirement for large areas of land, approximately 10–100 times as much land area as a conventional treatment plant, or, in terms of capacity, 5–40 acres per $10^6$ gallons of wastewater treated per day. Another serious drawback in existing wetland wastewater treatment technologies has been the poor removal performance of some contaminants, such as total phosphorus (Dierberg and Brezonik, 1983; Richardson, 1985). Long-term TP removal in wetlands underlain by organic soils such as in the Everglades relies on peat accumulation, which occurs at a rate of approximately 1 g P/m$^2$ year. Although this is an extremely slow process, given enough wetland area, concentrations of TP in sugarcane field drainage water can be reduced to less than 50 ppb (Abtew et al., 1995).

Limerock beds or filters have been used less frequently for removing contaminants from surface and wastewaters than have wetlands. Whereas physical (e.g., settling, filtration) and biological (e.g., oxidation, nitrification, denitrification) processes dominate in attenuating contaminants in wetlands, chemical processes (e.g., adsorption, surface complexation, surface precipitation) predominate in the removal of contaminants on the surfaces of limerock.

To date, most of the applications of limerock for contaminant removal in waste streams have been experimental, often producing lackluster results. This is because of the moderate pH typically found for waters in equilibrium with calcium carbonate; pH values of phosphorus-laden waters are frequently lower than 8.0 due to the respiratory activities of microbiota and the adsorption/precipitation reactions, both of which produce hydrogen ions. It has been found that the efficacy of contaminant removal mediated by limerock increases with pH from a value of approximately 8.0, below which the process is minimally effective.

SUMMARY OF THE INVENTION

It is therefore an object of the present invention to provide an integrated water and wastewater treatment system and method that are less land intensive than wetlands-only systems.

It is a further object to provide such a system and method that are more passive and thus environmentally "friendlier" than conventional treatment technologies.

It is another object to provide such a system and method that combine the advantages of two integrated water and wastewater treatment techniques.

It is an additional object to provide such a system and method that can treat effluents having a variety of contaminants.

It is yet a further object to provide such a system and method that include temporal process control.

It is yet another object to provide such a system and method that can be modified to accommodate different land area requirements, contaminant sources, and flow regimes.

These and other objects are achieved by the wastewater treatment system and method of the present invention, which links a biological module with a chemical module. The biological module has an inlet into which contaminated water is fed, either by natural flow or aided by mechanical means. This module contains a plant bed that has the characteristic of being able to remove the contaminant, which typically contains phosphorus. In a particular embodiment, the plant bed also has the characteristic of raising the pH of the influent.

The chemical module has an inlet in fluid communication with the outlet of the biological module, and hence receives water that has been partly depleted of the contaminant, and, in the particular embodiment mentioned, also has a higher pH than the original influent. This module comprises a compound, typically in solid form, that has the characteristic of further removing the contaminant from the water. In the particular embodiment, the solid material contains a calcium compound such as calcium carbonate, and the removal includes forming an adsorbate, complex, and/or precipitate on the solid surface that includes a calcium-phosphorus bond. The pH-raising characteristic of the biological module enhances the effectiveness of this adsorption, surface complexation, and/or precipitation.

In a first embodiment the system comprises a submersed aquatic vegetation (SAV) module with a limestone or limerock (LR) module. SAV refers to any system containing submerged plants (macrophytes, periphyton, and/or phytoplankton), which by their photosynthesis elevates water column pH. The integrated SAV-LR treatment system and method are amenable to the treatment of contaminated surface and ground waters, domestic wastewater, industrial waste or process water, acid mine drainage, urban runoff, contaminated river, lake, reservoir, pond, estuarine, or nearshore ocean water, sludge, and agricultural wastewater and runoff.

The types of contaminants that can be treated in the system include suspended solids, nitrogen, phosphorus, sulfur, metals, and carbonaceous compounds (both oxygen-demanding and synthetic complex organic materials). For an initial test of this concept, P was removed from agricultural drainage water (ADW) and domestic sewage effluent.

The integrated treatment system presented in this invention overcomes the pH constraint by the induction of high pH from the photosynthesis in the aquatic plant treatment unit, which accelerates the rate and extent of contaminant removal by the limerock treatment unit. Limerock containing predominantly calcium carbonate as either calcite, dolomite, or aragonite, in conjunction with submerged aquatic plants, offers the advantage of treating waste streams, and surface and ground waters, while requiring less land area.

In another embodiment the biological module comprises a raceway containing attached algae (periphyton).

The features that characterize the invention, both as to organization and method of operation, together with further objects and advantages thereof, will be better understood from the following description used in conjunction with the accompanying drawings. It is to be expressly understood that the drawings are for the purpose of illustration and description, and are not intended as a definition of the limits of the invention. These and other objects attained, and advantages offered, by the present invention will become more fully apparent as the description that now follows is read in conjunction with the accompanying drawings.

BRIEF DESCRIPTION OF THE DRAWING

FIG. 4 is a cross-sectional schematic view of an exemplary arrangement for the sequencing of a periphyton raceway module and a limerock treatment module.

DETAILED DESCRIPTION OF THE PREFERRED EMBODIMENTS

Figure 1:
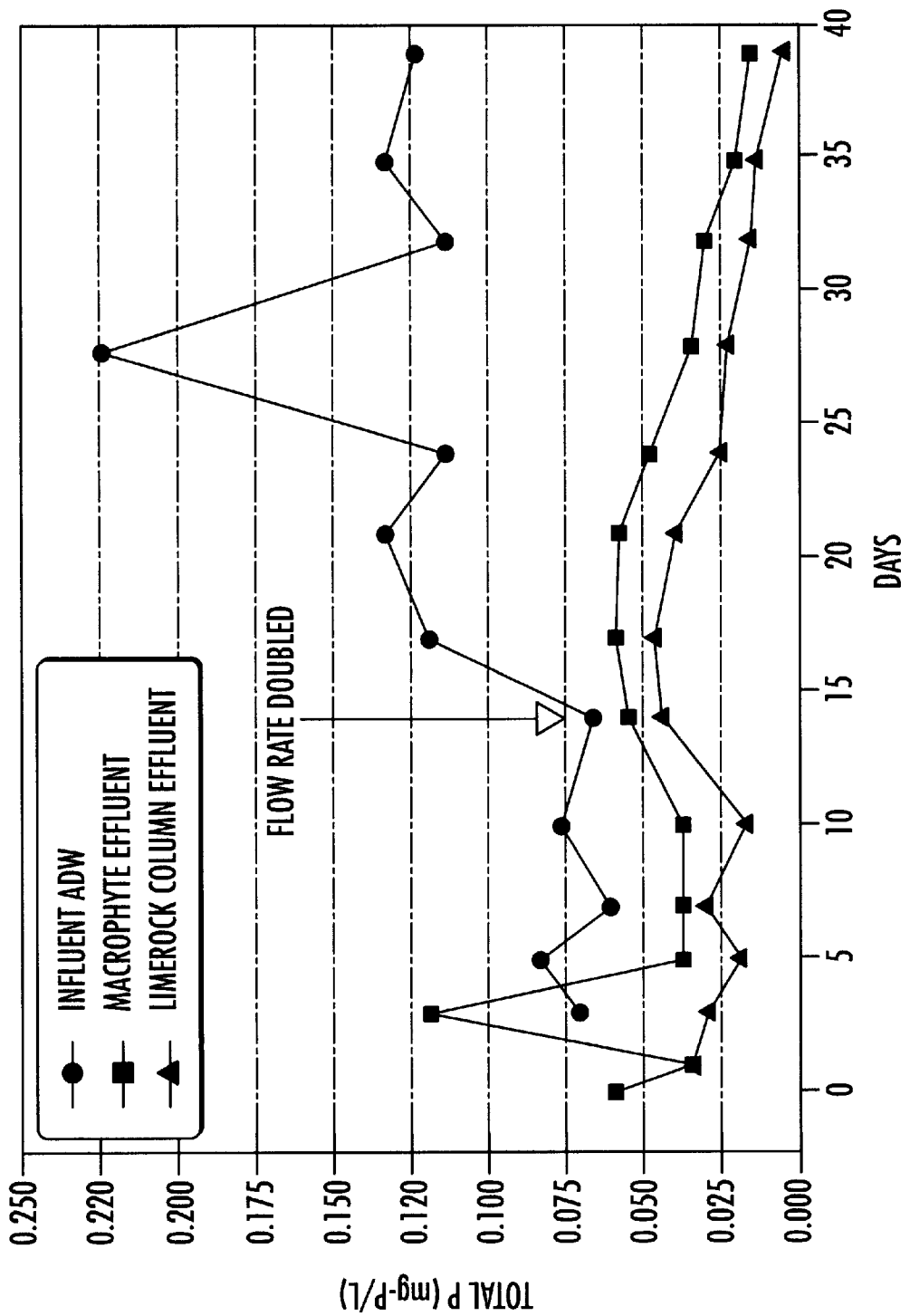
FIG. 1 is a graph of the performance of a microcosm-scale integrated submersed macrophyte-limerock system. The values represent total P concentrations of the influent ADW, the effluent from the submersed macrophyte microcosm, and effluent from the limerock column. Following the commencement of steady-state operation (denoted by the arrow), the respective hydraulic retention times for the macrophyte and limerock columns were 2.6 days and 1.8 hours.

A description of the preferred embodiments of the present invention will now be presented with reference to FIGS. 1–4.

A first embodiment of the invention comprises a water treatment system that includes an inlet and an outlet for each of two discrete unit treatment processes, which can be configured in various sequential and repeating patterns. The treatment units are preferably discrete, immutable areas within the system, although this is not intended to be a limitation on the broad construction of the invention.

This system comprises a submerged aquatic plant-based treatment module in fluid communication with and followed by a limerock bed. In some embodiments, a "pretreatment" limerock bed is positioned prior to the submerged plant unit in the treatment sequence. The dominant plant community could be a polyculture or monoculture of SAV, periphyton (attached algae), or phytoplankton, located in either naturally occurring or constructed wetlands and ponds. The final treatment unit, the limerock bed, preferably exists sequential to the wetland unit. The limerock module can be buried or open to the atmosphere in any of various geometric shapes and sizes, and may be contained in galleries, packed beds, gabions, or pits. The limerock bed may be unlined or lined with geotextile fabric.

Wastewater, runoff, ground water, or surface water is admitted into the inlet of either the SAV treatment unit or that of the pretreatment LR bed at a prescribed and controlled hydraulic residence time. The pretreatment LR bed, configured either as a separate unit or contiguous with the SAV cell, is located at the beginning (influent end) of the treatment train. The pretreatment LR bed may be added as necessary if the influent has a low pH and/or contains low calcium. Under such circumstances, passage of the influent through the pretreatment LR bed elevates the pH and the calcium concentration, prior to being discharged to the SAV module inlet.

An important purpose of the SAV module is pH elevation caused by plant photosynthesis. Flow equalization and initial contaminant removal are additional objectives. Assuming the system is configured sequentially, the elevated-pH water is routed from the submerged plant cell to the final limerock bed, where additional contaminant removal is accomplished by adsorption, surface complexation, and/or surface precipitation. Depending on the hydraulic residence time and wastewater strength, the limerock-treated effluent may be routed to additional two-unit sequential treatment systems, recycled to the initial submerged plant cell, or discharged directly to receiving waters.

The control system comprises a sensor positioned in the submerged plant treatment unit for sensing a hydraulic or water quality parameter (water level, flow, pH, specific conductance, dissolved oxygen) of the water to be treated. Water can flow from one unit process to the next by gravity. Alternatively, the sensors can be used as an input to a processor that directs pumps and/or valves to move the water into the submerged plant treatment unit, and to transfer water from the biological module (submerged plant treatment unit) to the chemical module (limerock treatment unit) in the case of a discretized treatment system.

Alternatively, or additionally, a sensor is positioned within the limerock treatment unit. The means for removing water from the submerged plant treatment unit is then responsive to the sensed parameter(s), permitting recirculation of water from the limerock treatment unit to the submerged plant treatment unit, for example. Recirculation can enhance water treatment within the system by, for example, diluting high concentrations of constituents in the influent water, and/or by cycling partially degraded or immobilized contaminants in the effluent of the limerock unit back to the submerged plant or limerock treatment units, where more degradation and immobilization can occur. The control of the flow of water to each of the unit processes permits adjustment of the hydraulic residence time for each unit, which is an important parameter in optimizing the treatment system's performance. The rate and location of a recirculation point also can effectively control the sizes of environmental zones within the system.

An element of the process control of both units comprises an option of adding hydrated lime [$Ca(OH)_2$], quick lime (CaO), sodium bicarbonate ($NaHCO_3$), sodium hydroxide (NaOH), and/or sodium carbonate ($Na_2CO_3$) to at least one of the two modules. (This list of compounds is not intended to be limiting, as any alkaline substance could in principle be effective.) Such an adjustment may be needed to raise the pH during times when the plant module cannot photosynthetically increase the pH to sufficient levels (during, e.g., high-flow events, cloudy weather) and to rejuvenate the surface active sites on the limerock.

A second embodiment comprises a superposition or juxtaposition of two unit treatment systems into one area such that they are in fluid communication with each other, and fixed barriers are not used between the zones. This implies that the zones are not discrete, immutable areas within the system, but instead overlie or overlap each other. In this embodiment, the limerock can be placed within the submersed plant treatment cell as either bottom or sidewall material, or as a structural element such as a gabion or levee. However, the processes effecting contaminant removal cited in the first embodiment are the same as those occurring in this embodiment. Also, the pH-control system referenced in the first embodiment is applicable to this embodiment, as is the capacity to recycle effluent to the treatment cell.

A third embodiment comprises a sequential two-unit treatment train comprising attached algae (periphyton) growing in a raceway as a first treatment unit. The limerock bed receives the effluent from the raceway and further polishes it. The treatment units are preferably discrete, immutable areas within the system, and can be configured in a plurality of sequential and repeating patterns. The processes effecting contaminant removal cited in the first embodiment are the same a those occurring in this embodiment. Also, the pH-control system referenced in the first embodiment and the option of including limerock as an "up-front" influent processing unit are applicable to this embodiment, as is the capacity to recycle the effluent to the periphyton raceway or LR bed.

Phosphorus Removal in Agricultural Drainage Waters Using a SAV-LR Unit Sequence Economic and Environmental Significance Unlike sewage treatment plants (STP), which are designed for treating more predictable flows and influent concentrations, ADW flows and contaminant concentrations vary widely depending on weather conditions and agricultural practices. A well-defined collection system also delivers wastewater to an STP, whereas ADW has a more diffuse source and conveyance system. Thus treating ADW requires more adaptive and flexible technologies than what is commonly practiced at STPs. It is also desirable to treat ADW with a less costly system and method.

The SAV-LR treatment process of the present invention represents such a technology, and is free from harmful or hazardous treatment chemicals or residuals. The SAV-LR treatment is environmentally acceptable because it uses a combination of two P removal systems commonly found (and frequently used by man) in nature: biological removal within wetlands and chemical immobilization as calcium salts. In addition, the SAV-LR treatment represents a low-cost alternative for removing P from ADW because it requires no expensive chemical fixatives (such as are typical for physical-chemical systems like microfiltration or chemical coagulation) and relies on a more passive and less energy-intensive modus operandi (lower energy, capital, operating and maintenance costs).

Theoretical Background

An aim of the technology is to remove P and other constituents by chemical adsorption, complexation, and/or precipitation as at least one of a plurality of calcareous complexes. Based on thermodynamic and kinetic considerations, pH is one of the key parameters that determines whether removal of inorganic P as an insoluble calcium phosphate complex will occur, especially in waters containing high levels of calcium. The "front-end" SAV in the SAV-LR concept can raise the pH to values that increase the saturation of calcium phosphate compounds to levels above the critical supersaturation necessary for precipitation via heterogeneous nucleation. Thus two important functions of the SAV component are: (1) to raise the pH of the ADW prior to its being routed to limerock; and (2) to remove some of the soluble P and other constituents via plant uptake and chemical immobilization mechanisms. Such chemical removal mechanisms may include, but are not limited to, precipitation, complexation, and/or adsorption on plant surfaces. Other functions that the initial SAV treatment perform include conversion of organic P to inorganic P, acting as a storage reservoir for incoming runoff, and removing the bulk of the particulates in the runoff.

Besides pH, another important parameter that is preferably optimized for efficient inorganic P removal is a suitable surface for adsorption and/or heterogeneous nucleation and/or surface precipitation to occur. This includes the selection of both the appropriate type of surface and the amount of surface area to reduce induction time and promote the heterogeneous nucleation of calcium phosphate compounds without creating blockages to hydraulic conductivity. An appropriate substrate is one whose crystalline surface matches well with the lattice structure of the nucleated species. If an appropriate match is made, then the interfacial energy between the two solids is smaller than the interfacial energy between the nucleated crystallites and the solution, resulting in nucleation at lower concentrations on a heteronucleus surface than in a heterogeneous solution. If this happens, then P removal by nucleation will more likely occur.

Limestone can provide the substrate for lowering the energy of activation necessary to immobilize phosphates as insoluble complexes on its surface, provided the solution conditions are appropriate. Investigations have shown that calcite acts as a well-matched surface for the nucleation of apatite (Stumm and Morgan 1981). Preferred solution conditions include a high pH, preferably above a value of 8.0. The elevation in pH by the SAV prior to the ADW's being exposed to the limerock enhances the P removal by the limerock, especially considering the production of hydrogen ions that occurs when calcium compounds (i.e., calcite and calcium phosphate) adsorb or precipitate.

Experimental Results

To demonstrate the ability of a SAV-LR bed combination to remove phosphorus to extremely low concentrations, a 39-day microcosm study with sugarcane ADW was performed (FIG. 1). A submerged macrophyte (*Ceratophyllum demersum*) was cultured in a small (41-liter volume) outdoor microcosm. This microcosm was fed ADW continuously with a peristaltic pump. Effluent from the microcosm was then fed through a PVC column containing coarse (0.5-in.- diameter) limerock. ADW hydraulic retention time (HRT) in the microcosm was 2.6 days, and in the limerock column, 1.8 hours. After 15 days, the system reached steady-state performance. From days 15–39, average total P levels for the ADW influent, microcosm effluent, and limerock column effluent were 0.129, 0.039, and 0.028 mg/L, respectively. On three sampling dates, system effluent total P levels were below 0.025 mg/L, declining to as low as 0.010 mg/L on day 39.

Phosphorus Removal in Treated Sewage Effluent Using Periphyton Raceways Sequenced with Limerock Beds We demonstrated the importance of pH for enhancing wastewater phosphorus removal by limerock with the following experiment. A small (550 liter) "control" limerock bed received treated municipal wastewater effluent at a 2-hour hydraulic retention time. A similar bed, also operated at a 2-hour HRT, received treated effluent that had first been passed over a 1.8 m² periphyton filter. The long, linear periphyton filter was operated at a short HRT (10 min). Effluent from the periphyton filter exhibited a high pH (here, 9.4), which in turn led to markedly better P removal in the subsequent limerock bed than in the "control" limerock bed (Table 1).

Table 1. Mean pH and total phosphorus concentrations in a "control" limerock bed, and in an "experimental" limerock bed preceded by a periphyton filter. Note that the periphyton filter effluent is the influent to the experimental limerock bed. Values represent means of measurements conducted weekly over a 6-month period.

| Location | pH | Total P (mg/L) |
| --- | --- | --- |
| Control limerock bed influent | 7.8 | 0.466 |
| Control limerock bed effluent | 7.7 | 0.448 |
| Periphyton filter influent | 7.9 | 0.440 |
| Periphyton filter effluent | 9.4 | 0.417 |
| Limerock bed effluent | 8.8 | 0.348 |

Submerged Aquatic Vegetation Cell(s) Sequenced with Limerock Beds(s)

Figure 2:
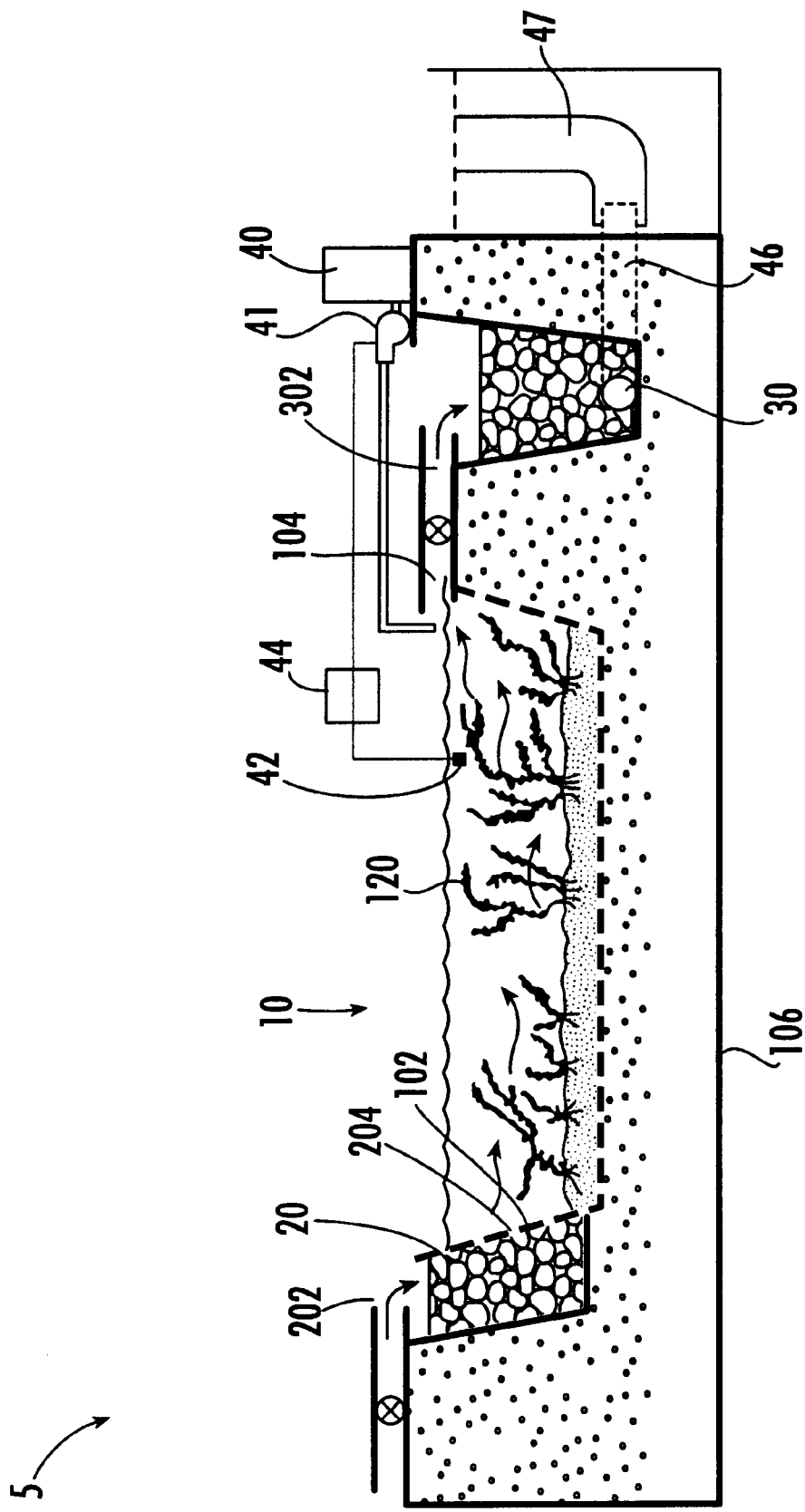
FIG. 2 is a cross-sectional schematic view of an exemplary arrangement for a sequenced submerged aquatic plant treatment module and a limerock treatment module.

An exemplary layout of the first embodiment 5 of the present invention, as shown in FIG. 2, is a submerged aquatic vegetation 120 module 10 in fluid communication with but separated from two limerock (LR) treatment cells 20,30. Water and wastewater may or may not be fed through the first LR bed 20, depending on the nature of the influent water. This LR bed 20 has an outlet 204 that feeds the input 102 of the SAV cell. The SAV cell 10 also has an outlet 104, which also comprises the water inlet 302 to the second LR bed 30. In the layout shown in FIG. 2, the treatment cells 20,10,30 are approximately linearly sequential from the first LR cell inlet 202 to the second LR bed 30. Such a sequence of treatment cells may be desirable at selected sites depending upon the characteristics of the water to be treated. The two-unit sequence shown in FIG. 2 may not necessarily be the optimal number of sequences. Depending on the nature of the waste streams, the concentration of contaminants within the waste streams, and the hydraulic residence times selected for each of the treatment units, it may be necessary to construct a series (multiple linear sequencing) of the two unit sequences shown in FIG. 2.

The photosynthetic increase in pH within the SAV cell 10 not only removes contaminants within that cell, but also further removes contaminants within the downstream LR bed(s) 30. Besides the removal of contaminants via sorption, complexation, and precipitation processes within the SAV cell 10, additional removal occurs due to plant uptake and microbial and physical processes, which include, but are not limited to, denitrification, assimilation, settling, and filtration. In addition to effecting contaminant removal, the SAV cell 10 also functions as a flow equalization basin; i.e., it may function as a storage cell to capture and hold storm water and wastewater surges.

An important purpose of the second LR bed 30 is for effluent polishing; another is to lower the pH to a more circum-neutral range prior to release into receiving waters or soils. This pH reduction is caused by the production of hydrogen ions from the chemical processes (adsorption, surface complexation, and precipitation) that occur within the LR bed, which lowers the elevated pH intake waters to a more acceptable neutral range for release.

Since pH is an important parameter in determining the efficacy of contaminant removal within the second LR bed 30, the system 5 further comprises a pH control system. The control system in a particular embodiment comprises a pH sensor 42 positioned in contact with water within the SAV module 10, generally adjacent the outlet 104. In an alternate embodiment the pH sensor is positionable within the second LR module 30. The control system further comprises a chemical control to ensure the maintenance of a high (>8.0) pH (normally produced by photosynthetic activity) of water entering the second LR bed 30. This "backup" chemical control unit can comprise, for example, an off-line tank 40 that contains an alkaline substance, such as hydrated lime $[Ca(OH)_2]$, quick lime (CaO), sodium bicarbonate ($NaHCO_3$), sodium hydroxide (NaOH), or sodium carbonate $[Na_2(CO)_3]$, although these compounds are not intended to be limiting.

The tank 40 is activatable by a processor 44 that receives input from the pH sensor 42 within the SAV module or within the LR bed. When the pH of the SAV module 10 falls to a predetermined minimum acceptable value, which may occur, for example, because of unexpected high flows or prolonged cloudiness, the processor 44 activates an injection pump 41 of the chemical tank 40, and the chemical is added to the water within, or leaving, the SAV module 10. The chemical can also be added to reactivate the surface active sites on the limerock within the second LR module 30 should it become saturated, thereby prolonging the life of the LR module 30.

In addition to pH control via chemical additives, the discharge rate from the SAV module 10 to the second LR module 30 can be metered and automatically set to a desired flow, or alternatively shut off during periods of low pH (night time) or to allow for inspection or maintenance of the LR bed. Specifically, stage height within the SAV module can be linked by microprocessor to the valve(s) controlling the discharge rate from the SAV module 10 to the second LR module 30. Alternatively, instead of stage height, the pH measured within the SAV module 10 could be linked by microprocessor to the valve(s) controlling the discharge rate of water leaving the SAV module 10 to LR module 30.

The bottom of the SAV module 10 may be unlined or lined with a liner 106, for example, a geotextile, either below ground or at ground level with a surrounding levee. The water exiting the second LR bed 30 may infiltrate freely into the adjacent soil, or be routed via a perforated collector pipe 46 to an outlet sump such as an adjustable standpipe 47. The effluent is then discharged to a receiving water or constructed pond, or recycled back to the influent distribution of either the SAV module 10 or one of the LR cells 20,30. Both the influent distribution and recycling devices can be configured for plug flow, step-feed, or peripheral feed center drawoff.

Limerock Bed within the Submerged Aquatic Vegetation Cell

Figure 3:
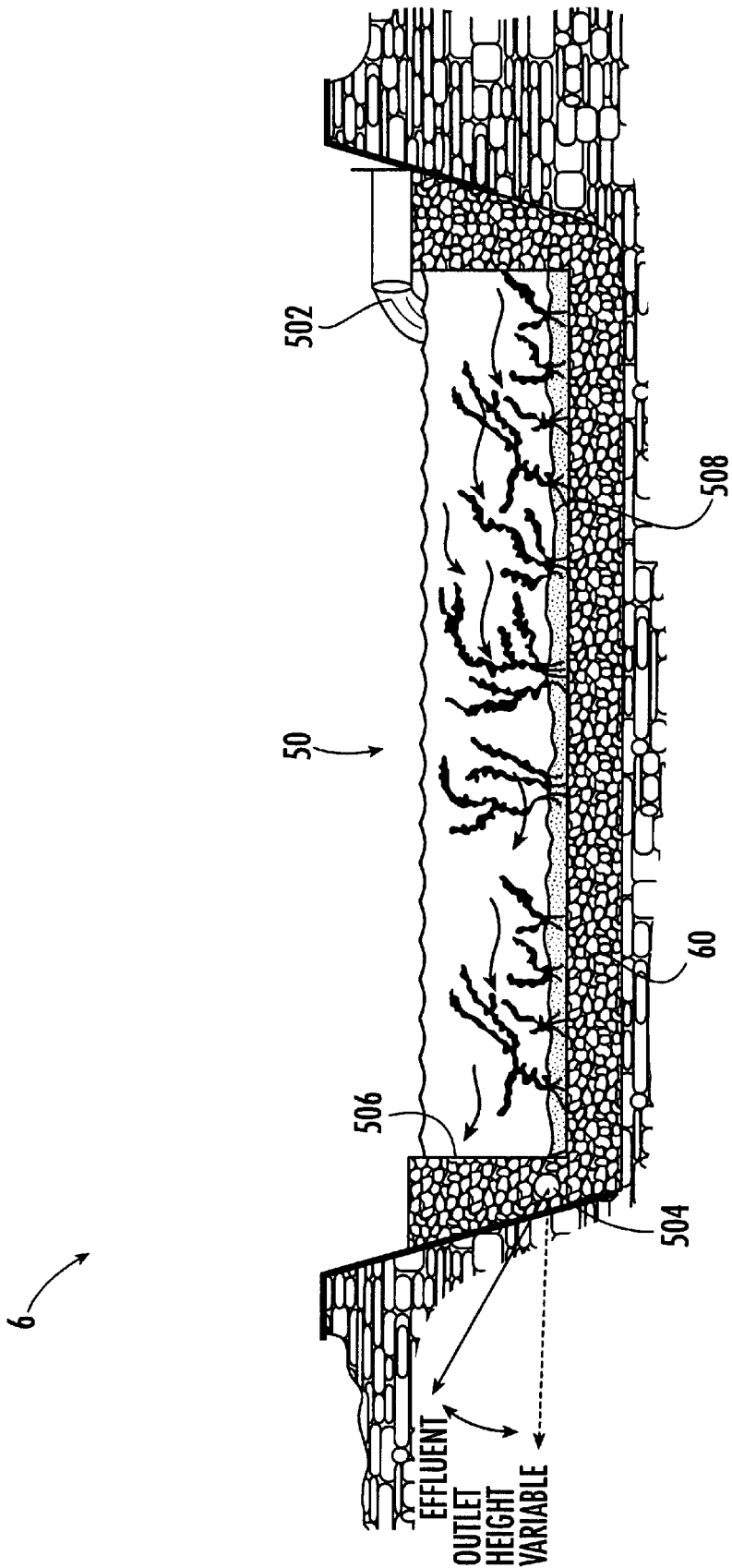
FIG. 3 is a cross-sectional schematic view of an exemplary arrangement for a limerock treatment module as a sidewall and bottom substrate within a submersed aquatic plant treatment module.

An exemplary layout of the second embodiment 6 of the present invention, as shown in FIG. 3, comprises a submersed aquatic vegetation cell 50 occupying generally the same vertical area as a limerock (LR) treatment module 60. The combined SAV 50 and LR 60 modules have a water inlet 502 and an outlet 504. In the layout shown in FIG. 3, the LR bed 60 is located along the sides 506 and the bottom 508 of the SAV module 50. In alternate embodiments the LR bed 60 may be positioned along either the sides 506 or the bottom 508. Combining the treatment modules may be desirable in some cases, such as under conditions of land or site construction constraints.

The combined modules 50,60 shown in FIG. 3 may be repeated sequentially any number of times, depending on the nature of the waste streams, the strengths of the contaminants within the waste streams, and the hydraulic residence times.

The functions of each treatment component and removal processes for the contaminants are the same as previously described for the first embodiment. One difference between the two embodiments is that the spatial separation between the two treatment cells present in embodiment one has been eliminated in the second embodiment. The second embodiment is adapted to treat wastewater within a single unit process, where each treatment module is in unrestricted (subject to diffusion limitations) fluid communication with the other.

The same chemical additives, control units, and sensors as described for embodiment one also apply to alternate sub-embodiments of embodiment two. As in embodiment one, the bottom of the SAV module 50 may be unlined or lined, for example, with a geotextile, and either below ground or at ground level with a surrounding levee. The water exiting the system 6 may infiltrate freely into the adjacent soil, or be routed via a perforated collector pipe to an outlet sump as shown in FIG. 2. The effluent is then discharged to a receiving water or constructed pond, or recycled back to the influent distribution 502 of either the SAV 50 or the LR 60 module. Both the influent distribution and recycling devices can be configured for plug flow, step-feed, or peripheral feed center drawoff.

Periphyton Raceways Sequenced with a Limerock Bed

An exemplary layout of the third embodiment 7 of the present invention, as shown in FIG. 4, comprises a raceway 70 that serves as the biological module. The raceway 70 is preferably grown with attached algae (periphyton) 706 that are preferably separated from the limerock treatment module 80. The periphyton raceway 70 has a water inlet 702 and an outlet 704, which drains into the LR module 80.

In the layout shown in FIG. 4, the treatment modules (periphyton raceway 70 plus LR bed 80) are approximately linearly sequential from the inlet 702 to the LR bed 80. The two-unit sequence shown in FIG. 4 is not necessarily an optimal number of sequences. Depending on the nature of the waste streams, the strength of the contaminants within the waste streams, and the hydraulic residence times selected for each of the treatment units, it may be necessary to construct a series (such as by multiple linear sequencing) of the two-unit sequences shown in FIG. 4.

As in the first embodiment, the LR bed 80 serves to remove contaminants further and to decrease the pH to circum-neutral levels. Some of the differences between the first 5 and the third 7 embodiments comprise the use of attached algae 706 (periphyton) as the major plant community in the third embodiment 7, and the use of raceways 70 in the third embodiment 7, which typically have shorter hydraulic retention times and lower storage volumes than the SAV modules 10 in the first embodiment 5.

However, the functions of each treatment component and the removal processes for the contaminants are substantially the same as previously described for the first embodiment 5. That is, the attached algae 706 perform substantially the same functions as the SAV modules 10,50 did in the first 5 and the second 6 embodiments: to raise the pH and remove contaminants. Owing to the typically short hydraulic residence time and small storage area of the periphyton raceway 70, flow equalization is generally not accomplished with this unit process. The LR bed 80 furnishes additional contaminant removal and provides effluent with a pH that is in a range that is circum-neutral.

The same chemical additives, control units, and sensors as described for the first embodiment 5 also apply to this embodiment 7. The bottom of the periphyton raceway 70 may be unlined or lined, as previously, with a geotextile or a natural substrate such as gravel, and stand above ground or at ground level. The water exiting the combined periphyton raceway module 70 and LR bed 80 may infiltrate freely into the adjacent soil, or be routed via a perforated collector pipe to an outlet sump substantially identically to that shown in FIG. 2. The effluent is then discharged to a receiving water or constructed pond, or recycled back to the influent distribution of either the raceway 70 or the LR bed 80. Both the influent distribution and recycling devices can be configured for plug flow, step-feed, or peripheral feed center drawoff.

LITERATURE CITED

Abtew, W., M. J. Chimney, T. Kosier, M. Guardo, S. Newman, and J. Obeysekera. 1995. The Everglades Nutrient Removal Project: A constructed wetland designed to treat agricultural runoff/drainage, pp. 45–56. In K. L. Campbell (Ed.), *Versatility of Wetlands in the Agricultural Landscape*, Sep. 17–20, 1995. American Society of Agricultural Engineers.

Anderson, D. L., A. Ceric, G. Nochowicz, J. E. Brady, and D. Ramirez. 1992. Reduction of Phosphorus Concentrations in Agricultural Drainage of the EAA by Precipitation, Coagulation, and Sedimentation. Updated Report to the Florida Sugar Cane League. Report 92-11. University of Florida/IFAS, Everglades Research and Education Center, Belle Glade.

Dierberg, F. E., and P. L. Brezonik. 1983. Nitrogen and phosphorus mass balances in natural and sewage-enriched cypress domes. *Journal of Applied Ecology* 20:323–37.

Richardson, C. J. 1985. Mechanisms controlling phosphorus retention capacity in freshwater wetlands. *Science* 228:1424–27.

Stumm, W., and J. J. Morgan. 1981. *Aquatic Chemistry. An Introduction Emphasizing Chemical Equilibria in Natural Waters*. Wiley & Sons, New York.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A treatment system for the removal of a contaminant from water comprising:
   a biological treatment module having an inlet for admitting water to be treated and an outlet, the biological treatment module comprising submerged aquatic vegetation having biological means for removing the contaminant from the water and for elevating the pH of the water;
   a chemical treatment module having an inlet in fluid communication with the biological treatment module outlet, the chemical treatment module comprising a chemical compound having a property suitable for removing the contaminant from the water and for lowering the pH of the water;
   a sensor positioned in at least one of the biological and chemical treatment modules for sensing at least one of a hydraulic or a water quality parameter; and
   means for recirculating treated water from the chemical treatment module back to the biological treatment module responsive to a sensed parameter.

2. The treatment system recited in claim 1, wherein the submerged aquatic vegetation is selected from a group consisting of a macrophyte, an attached periphyton bed, and a phytoplankton.

3. The treatment system recited in claim 1, wherein the contaminant comprises at least one of a suspended solid, nitrogen, phosphorus, sulfur, a metal, and a carbonaceous compound.

4. The treatment system recited in claim 1, wherein the chemical/compound substrate comprises a calcium compound.

5. The treatment system recited in claim 1, wherein the chemical module comprises a limerock bed.

6. The treatment system recited in claim 1, further comprising a pretreatment chemical module having an inlet for admitting water to be treated and an outlet in fluid communication with the biological module, the pretreatment chemical module for elevating a pH of the water to be treated.

7. The treatment system recited in claim 6, wherein the pretreatment chemical module comprises a limerock bed.

8. The treatment system recited in claim 1, wherein the water to be treated comprises agricultural drainage water and the contaminant comprises phosphorus.

9. A treatment system for the removal of a contaminant from water comprising:
   a biological treatment module having an inlet for admitting water to be treated and an outlet, the biological treatment module comprising submerged aquatic vegetation having biological means for removing the contaminant from the water and for elevating the pH of the water; and
   a chemical treatment module having an inlet-in fluid communication with the biological treatment module outlet, the chemical treatment module comprising chemical compound having a property suitable for removing the contaminant from the water and for lowering the pH of the water;
   wherein the biological treatment module comprises a periphyton raceway and the chemical treatment module comprises a limerock bed.

10. The treatment system recited in claim 9, wherein the contaminant comprises at least one of a suspended solid, nitrogen, phosphorus, sulfur, a metal, and a carbonaceous compound.

11. The treatment system recited in claim 9, wherein the chemical substrate comprises a calcium compound.

12. The treatment system recited in claim 9, further comprising a pretreatment chemical module having an inlet for admitting water to be treated and an outlet in fluid communication with the biological module, the pretreatment chemical module for elevating a pH of the water to be treated.

13. The treatment system recited in claim 9, wherein the water to be treated comprises agricultural drainage water and the contaminant comprises phosphorus.

14. A treatment system for the removal of a contaminant from water comprising:
   a periphyton raceway comprising an attached algal bed having an inlet adapted to receive the water to be treated and an outlet, the algal bed adapted to remove contaminants and raise the pH of the water; and
   a limerock bed having an inlet in fluid communication with the raceway outlet, the limerock bed adapted to remove contaminants and lower the pH of the water.

15. The treatment system recited in claim 14, wherein the limerock bed comprises a sequential series of limerock beds.

16. A treatment system for the removal of a contaminant from water comprising:
   a biological treatment module having an inlet for admitting water to be treated and an outlet, the biological treatment module comprising submerged aquatic vegetation having biological means for removing the contaminant from the water and for elevating the pH of the water;
   a chemical treatment module having an inlet in fluid communication with the biological treatment module outlet, the chemical treatment module comprising a chemical compound having a property suitable for removing the contaminant from the water and for lowering the pH of the water;
   a sensor positioned in the biological treatment module for sensing at least one of a hydraulic or a water quality parameter, wherein the sensed parameter comprises pH; and
   a control unit having means for introducing a pH-elevating substance into the biological treatment module.

17. The treatment system recited in claim 16, wherein the submerged aquatic vegetation is selected from a group consisting of a macrophyte, an attached periphyton bed, and a phytoplankton.

18. The treatment system recited in claim 16, wherein the contaminant comprises at least one of a suspended solid, nitrogen, phosphorus, sulfur, a metal, and a carbonaceous compound.

19. The treatment system recited in claim 16, wherein the chemical substrate comprises a calcium compound.

20. The treatment system recited in claim 16, wherein the chemical module comprises a limerock bed.

21. The treatment system recited in claim 16, further comprising a pretreatment chemical module having an inlet for admitting water to be treated and an outlet in fluid communication with the biological module, the pretreatment chemical module for elevating a pH of the water to be treated.

22. The treatment system recited in claim 21, wherein the pretreatment chemical module comprises a limerock bed.

23. The treatment system recited in claim 16, wherein the water to be treated comprises agricultural drainage water and the contaminant comprises phosphorus.

* * * * *